(12) United States Patent
Goh et al.

(10) Patent No.: US 11,807,206 B2
(45) Date of Patent: Nov. 7, 2023

(54) EMERGENCY MANEUVERING USING LATERAL SLIDING

(71) Applicant: Toyota Research Institute, Inc., Los Altos, CA (US)

(72) Inventors: Yan Ming Jonathan Goh, Palo Alto, CA (US); John Subosits, Menlo Park, CA (US); Michael Thompson, San Juan Capistrano, CA (US); Alexander R. Green, Redwood City, CA (US); Avinash Balachandran, Sunnyvale, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 234 days.

(21) Appl. No.: 17/212,269

(22) Filed: Mar. 25, 2021

(65) Prior Publication Data
US 2022/0306059 A1  Sep. 29, 2022

(51) Int. Cl.
*B60T 8/1755* (2006.01)
*B60T 8/176* (2006.01)

(52) U.S. Cl.
CPC ......... *B60T 8/17558* (2013.01); *B60T 8/176* (2013.01); *B60T 8/17551* (2013.01); *B60T 2250/04* (2013.01); *B60T 2270/10* (2013.01); *B60T 2270/30* (2013.01)

(58) Field of Classification Search
CPC .. B60T 8/17558; B60T 8/17551; B60T 8/176; B60T 2250/04; B60T 2270/10; B60T 2270/30; B60T 2210/32; B60T 8/1755
See application file for complete search history.

(56) References Cited

U.S. PATENT DOCUMENTS

| 5,648,903 A | 7/1997 | Liubakka |
| 5,742,917 A * | 4/1998 | Matsuno ............ B60K 28/165 701/88 |

(Continued)

FOREIGN PATENT DOCUMENTS

| DE | 102012101546 A1 * | 8/2013 | ............ B60T 8/1755 |
| JP | 2014084081 A * | 5/2014 | |
| KR | 20070047574 A * | 5/2007 | ............ B60W 10/02 |

OTHER PUBLICATIONS

Liske DE 102012101546 A1 English Translation Espacenet (Year:2013).*

(Continued)

*Primary Examiner* — Jelani A Smith
*Assistant Examiner* — Alyssa Rorie
(74) *Attorney, Agent, or Firm* — Christopher G. Darrow; Darrow Mustafa PC

(57) ABSTRACT

Systems, methods, and other embodiments described herein relate to emergency lateral maneuvers using brake-induced tire sliding. In one embodiment, a method includes determining a vehicle state for a vehicle according to sensor data about a surrounding environment. The method includes computing, using the sensor data and the vehicle state, lateral accelerations that are yaw-free for the vehicle. The method includes, in response to detecting that the vehicle state is associated with an emergency event, selecting a maneuver from the lateral accelerations. The method includes controlling the vehicle according to the maneuver.

20 Claims, 5 Drawing Sheets

(56) References Cited

U.S. PATENT DOCUMENTS

| | | | |
|---|---|---|---|
| 6,157,892 A * | 12/2000 | Hada | B60T 8/17558 |
| | | | 340/436 |
| 7,318,629 B1 | 1/2008 | Sun et al. | |
| 8,108,106 B2 | 1/2012 | Takahara et al. | |
| 8,521,349 B2 | 8/2013 | Yu et al. | |
| 10,737,716 B2 | 8/2020 | Jung | |
| 2005/0267683 A1 * | 12/2005 | Fujiwara | G01S 13/931 |
| | | | 340/903 |
| 2011/0057507 A1 | 3/2011 | Frediani et al. | |
| 2016/0144838 A1 * | 5/2016 | Spencer | B60W 30/0953 |
| | | | 701/1 |
| 2020/0094797 A1 | 3/2020 | Shoji | |
| 2021/0009162 A1 | 1/2021 | Hecker et al. | |

OTHER PUBLICATIONS

Kim Joo Gon KR 20070047574 A English Translation Espacenet (Year:2007).*

Murakami JP 2014084081 A English Translation Espacenet (Year:2014).*

Velenis et al., "Modeling Aggressive Maneuvers on Loose Surfaces: The Cases of Trail-Braking and Pendulum-Turn", Conference: 2007 European Control Conference, ECC 2007.

Tavernini et al., "The Optimality of the Handbrake Cornering Technique," 52nd IEEE Conference on Decision and Control, Dec. 10-13, 2013.

Chakraborty et al. "Vehicle posture control through aggressive maneuvering for mitigation of T-bone collisions," In Decision and Control and European Control Conference (CDC-ECC), 2011 50th IEEE Conference on, pp. 3264-3269, Dec. 2011.

\* cited by examiner

EMERGENCY MANEUVERING USING LATERAL SLIDING

TECHNICAL FIELD

The subject matter described herein relates, in general, to systems and methods for emergency maneuvering of a vehicle, and, more particularly, to using lateral yaw-free maneuvers that involve rear tire saturation to induce sliding.

BACKGROUND

Vehicles may include various safety systems, such as anti-lock braking systems (ABS), electronic stability control (ESC), and so on. In general, the safety systems facilitate improved operation of a vehicle by assisting an operator with different control systems and/or providing controls directly. Even still some circumstances may not be avoidable. For example, in the instance of a hidden hazard that is present on a curve in a roadway, a vehicle may not have sufficient time to stop or maneuver around such an obstacle without inducing further difficulties with control. That is, there may be insufficient braking distance by the time an obstacle is observed to avoid the obstacle. Thus, even though ABS facilitates improved braking, in certain circumstances, this improved braking may be insufficient to avoid a collision. Moreover, safety systems, such as ABS and ESC generally assume a traditional control approach that avoids certain control patterns, such as sliding. While this approach is often desirable, there are instances in which the operation of these safety systems can hinder other approaches. Consequently, various difficulties persist in providing improved safety.

SUMMARY

Embodiments include systems, and methods that relate to an improved approach to emergency lateral maneuvers using brake-induced tire sliding. For example, in one arrangement, a control system can cause the vehicle to perform a controlled lateral slide to avoid obstacles that may be otherwise unavoidable using other approaches. As previously noted, while various systems, such as ABS and ESC provide improved stopping distance and better handling, when an obstacle is unavoidable from the perspective of a direct braking maneuver or turn, these systems provide no further assistance outside of the standard approach. Accordingly, the control system can recognize emergency events where a lateral maneuver could avoid a hazard and cause the vehicle to execute such a maneuver to avoid the hazard beyond what is generally provided by ABS and ESC.

In one approach, the control system acquires sensor data about the surrounding environment and also about the vehicle itself in order to determine a current state and the presence of any potential emergency events. From the vehicle state, the control system can compute potential lateral accelerations for maneuvering the vehicle away from oncoming hazards while identifying the hazards from sensor data about the surroundings. In particular, the lateral accelerations are yaw-free maneuvers that induce sliding in at least one rear wheel through a process of saturating an associated brake. Thus, the control system causes the vehicle to slide laterally, which is a more stable maneuver than directly steering to maneuver laterally around an obstacle, especially while in a high-speed turn, as steering in this way can induce a rapid increase in a yaw rate that causes further instability. As such, the control system may further temporarily disable the ABS and the ESC in order to ensure that the maneuver is carried out without interference. In this way, the system improves maneuvering of the vehicle to avoid emergency events.

In one embodiment, a control system is disclosed. The control system includes one or more processors and a memory communicably coupled to the one or more processors. The memory stores a braking module including instructions that when executed by the one or more processors, cause the one or more processors to determine a vehicle state for a vehicle according to sensor data about a surrounding environment. The braking module includes instructions to compute, using the sensor data and the vehicle state, lateral accelerations that are yaw-free for the vehicle. The braking module includes instructions to, in response to detecting that the vehicle state is associated with an emergency event, select a maneuver from the lateral accelerations. The braking module includes instructions to control the vehicle according to the maneuver.

In one embodiment, a non-transitory computer-readable medium including instructions that, when executed by one or more processors, cause the one or more processors to perform various functions is disclosed. The instructions include instructions to determine a vehicle state for a vehicle according to sensor data about a surrounding environment. The instructions include instructions to compute, using the sensor data and the vehicle state, lateral accelerations that are yaw-free for the vehicle. The instructions include instructions to, in response to detecting that the vehicle state is associated with an emergency event, select a maneuver from the lateral accelerations. The instructions include instructions to control the vehicle according to the maneuver.

In one embodiment, a method is disclosed. In one embodiment, the method includes determining a vehicle state for a vehicle according to sensor data about a surrounding environment. The method includes computing, using the sensor data and the vehicle state, lateral accelerations that are yaw-free for the vehicle. The method includes, in response to detecting that the vehicle state is associated with an emergency event, selecting a maneuver from the lateral accelerations. The method includes controlling the vehicle according to the maneuver.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
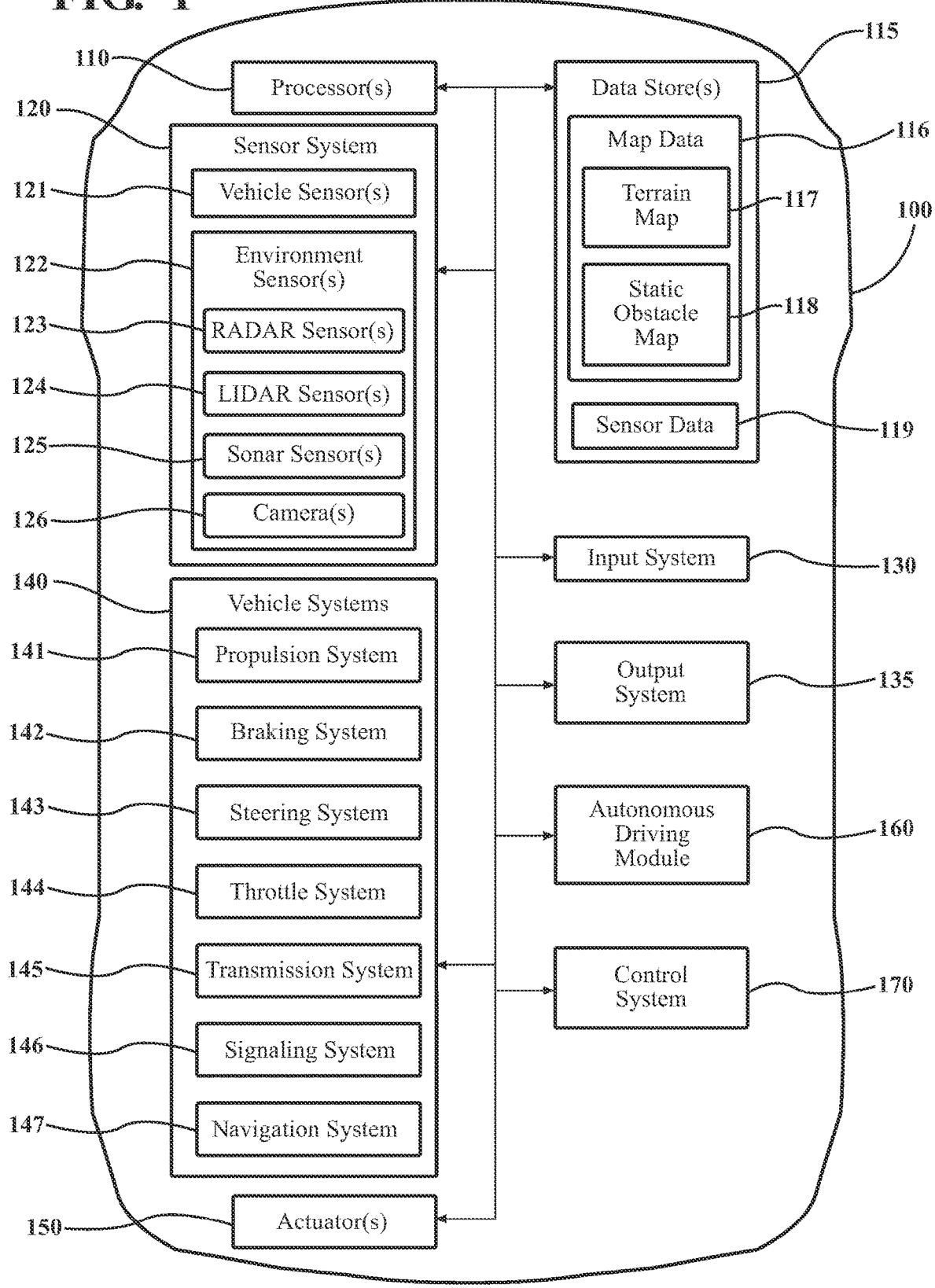
FIG. 1 illustrates one embodiment of a vehicle within which systems and methods disclosed herein may be implemented.

Systems, methods, and other embodiments associated with an improved approach to emergency lateral maneuvers using brake-induced tire sliding are disclosed. As previously noted, while various systems, such as ABS and ESC, provide improved stopping distance and better handling in some situations, when an obstacle is unavoidable from the perspective of a direct braking maneuver or steering, these systems provide no further assistance outside of the standard approach. That is, the ABS braking can only improve braking distances by preventing the brakes from locking the wheel; however, if the obstacle is within the improved braking distance, then a collision will still occur. Similarly, while ESC can improve control and overall stability, steering to avoid an obstacle still induces yaw acceleration in the vehicle and may still result in the obstacle being unavoidable while operating within parameters of the ESC.

Thus, in one arrangement, a control system can cause the vehicle to perform a controlled lateral slide to avoid obstacles that may be otherwise unavoidable using other approaches. That is, the control system can recognize emergency events where a lateral maneuver could avoid a hazard and cause the vehicle to execute such a maneuver to avoid the hazard beyond what is generally provided by ABS and ESC.

In one approach, the control system acquires sensor data about the surrounding environment and also about the vehicle itself in order to determine a current vehicle state and the presence of any potential emergency events. The sensor data can include observations of the surrounding environment, such as the presence of potential hazards in the roadway ahead of the vehicle and also information about the dynamics of the vehicle. From the vehicle state, the control system can compute potential lateral accelerations for maneuvering the vehicle away from potential oncoming hazards. In general, the lateral accelerations apply in contexts where the vehicle is making a high-speed turn, such as when rounding a corner on a highway during which saturating a rear tire by locking the wheel from braking induces a lateral slide.

Accordingly, the control system uses the sensor data to identify the hazards and to plan the lateral acceleration. In particular, the lateral accelerations are yaw-free maneuvers that induce sliding in at least one rear wheel through a process of saturating an associated brake. As used herein, the phrase "yaw-free" refers to a maneuver with substantially no yaw acceleration. In other words, "yaw-free" refers to a class of maneuvers with low or no yaw acceleration that is generally attained through the use of rear tire saturation. It should be noted that the use of the term "yaw" is commonly applied to several different aspects associated with movement of a rigid-body object, such as vehicle. For example, yaw angle is an angle associated with rotation of the object, yaw rate is an angular speed (measured in degrees/s), and yaw acceleration is an angular acceleration (measured in degrees/s$^2$). Accordingly, the "yaw-free" maneuver, as discussed herein, are maneuvers that avoid changing the yaw rate of the vehicle body, hence avoiding yaw acceleration or a change in the yaw, thereby being yaw-free.

In any case, when the control system identifies a hazard (e.g., an obstacle in the roadway), the control system can then cause the vehicle to slide laterally in a manner that is yaw-free. This lateral sliding is a more stable maneuver than directly steering to maneuver laterally around an obstacle, as steering in this way can induce an increase in yaw (i.e., rotation that is a change in yaw rate) that causes further instability. Moreover, the control system may temporarily disable the ABS and the ESC in order to ensure that the maneuver without interference since these systems generally prevent such maneuvers otherwise. In this way, the system improves maneuvering of the vehicle to avoid emergency events.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any electronic device that is associated with transportation and that, for example, is to maintain a trajectory or assist another device with maintaining such a trajectory.

In any case, the vehicle 100, as described herein, also includes various elements. It will be understood that, in various embodiments, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are illustrated as being located within the vehicle 100, it will be understood that one or more of these elements can be located external to the vehicle 100. Further, the elements shown may be physically separated by large distances and provided as remote services (e.g., cloud-computing services, software-as-a-service (SaaS), distributed computing service, etc.).

Some of the possible elements of the vehicle 100 are shown in FIG. 1 and will be described along with subsequent figures. However, a description of many of the elements in FIG. 1 will be provided after the discussion of FIGS. 2-5 for purposes of the brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In any case, the vehicle 100 includes a control system 170 that functions to efficiently determine possible lateral accelerations and the presence of any hazards in order to effectively execute a lateral maneuver to avoid such hazards. Moreover, while depicted as a standalone component, in one or more embodiments, the control system 170 is integrated with the autonomous driving module 160, the camera 126, or another component of the vehicle 100. The noted functions and methods will become more apparent with a further discussion of the figures.

Figure 2:
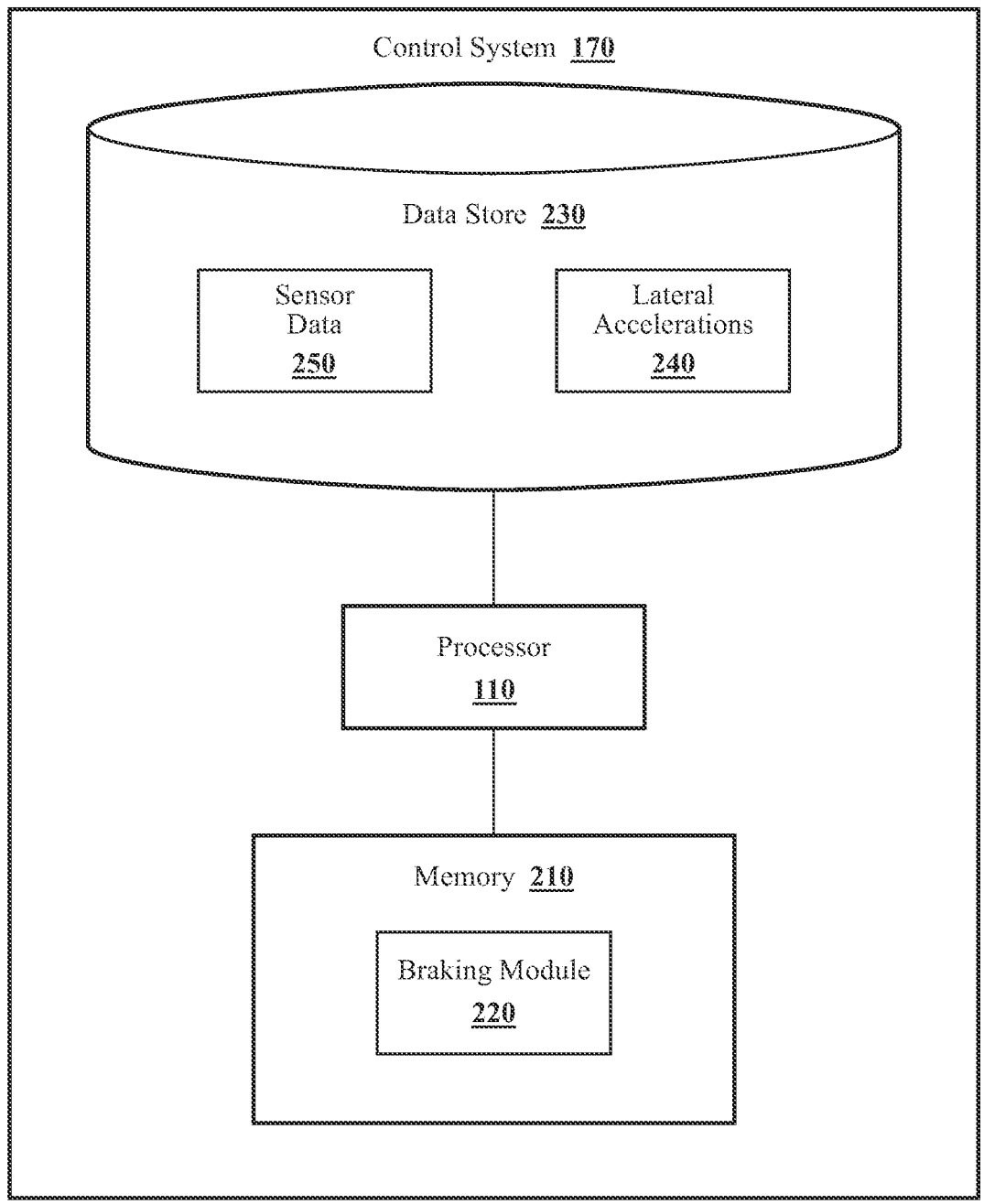
FIG. 2 illustrates one embodiment of a control system that is associated with emergency lateral maneuvers of a vehicle.

With reference to FIG. 2, one embodiment of the control system 170 is further illustrated. The control system 170 is shown as including a processor 110. Accordingly, the processor 110 may be a part of the control system 170 or the control system 170 may access the processor 110 through a data bus or another communication path. In one or more embodiments, the processor 110 is an application-specific integrated circuit (ASIC) that is configured to implement functions associated with a braking module 220. In general, the processor 110 is an electronic processor such as a microprocessor that is capable of performing various functions as described herein. While illustrated as a local resource, in various embodiments, the processor 110 may be a cloud-based resource that is remote from the control system 170. In one embodiment, the control system 170 includes a memory 210 that stores the braking module 220. The memory 210 is a random-access memory (RAM), read-only memory (ROM), a hard disk drive, a flash memory, or other suitable memory for storing the module 220. The module 220 is, for example, computer-readable instructions that, when executed by the processor 110, cause the processor 110 to perform the various functions disclosed herein.

Furthermore, in one embodiment, the control system 170 includes a data store 230. The data store 230 is, in one embodiment, an electronic data structure such as a database that is stored in the memory 210 or another memory and that is configured with routines that can be executed by the processor 110 for analyzing stored data, providing stored data, organizing stored data, and so on. Thus, in one embodiment, the data store 230 stores data used by the module 220 in executing various functions. In one embodiment, the data store 230 includes sensor data 250, and data for lateral accelerations 240, along with, for example, other information that is used by the module 220.

With continued reference to FIG. 2, the braking module 220 generally includes instructions that function to control the processor 110 to acquire data inputs from one or more sensors of the vehicle 100. The inputs are, in one embodiment, observations of one or more objects in an environment proximate to the vehicle 100 and/or other aspects about the surroundings. As provided herein, the braking module 220, in one embodiment, acquires sensor data 250 that includes at least observations of the surrounding environment, including potential hazards that may be present in front of the vehicle 100. Moreover, the sensor data 250 also includes, in one configuration, information about the vehicle 100 itself. That is, the braking module 220 may acquire the sensor data 250 to include information about the dynamics of the vehicle 100. Thus, an inertial measurement unit (IMU), wheel slip sensor, steering angle sensor, and other similar sensors may provide at least a part of the sensor data 250 in order to account for the present dynamics of the vehicle 100.

Accordingly, the braking module 220, in one embodiment, controls the respective sensors to provide the data inputs in the form of the sensor data 250. Additionally, while the braking module 220 is discussed as controlling the various sensors to provide the sensor data 250, in one or more embodiments, the braking module 220 can employ other techniques to acquire the sensor data 250 that are either active or passive. For example, the braking module 220 can passively sniff the sensor data 250 from a stream of electronic information provided by the various sensors to further components within the vehicle 100. Moreover, the braking module 220 can undertake various approaches to fuse data from multiple sensors when providing the sensor data 250 and/or from sensor data acquired over a wireless communication link. Thus, the sensor data 250, in one embodiment, represents a combination of perceptions acquired from multiple sensors.

In one or more approaches, the braking module 220 may further integrate information from a map another data source to improve perceptions about lane boundaries and other aspects of the surrounding environment. In any case, the sensor data 250 provides information about current operating circumstances so that the control system 170 can effect improved control of the vehicle 100 in emergency events. Accordingly, the braking module 220 includes instructions to cause the processor 110 to, in one or more arrangements, determine a vehicle state. The vehicle state is, for example, the current condition of the vehicle 100 in relation to current operation of the vehicle 100 itself and the surrounding environment. Thus, the vehicle state indicates information about dynamics of the vehicle including a current trajectory, speed, yaw, and so on.

The braking module 220 determines aspects about the surrounding environment to identify emergency events, which pertain to obstacles, hazards, and other aspects that may influence the safety of the vehicle 100 while operating along a roadway. For example, the braking module 220 analyzes the sensor data 250 to determine whether an obstacle is present in the roadway ahead of the vehicle 100 that may necessitate the vehicle 100 moving laterally to avoid the hazard. The braking module 220 assesses the surrounding environment to determine the presence of such an event as the vehicle 100 is proceeding along a route that may include a blind high-speed turn, which results in reduced time to react to such hazards.

The braking module 220 further computes the lateral accelerations 240 from the sensor data 250 at successive time steps as the vehicle 100 proceeds along a roadway. That is, the braking module 220 uses the vehicle state to determine controls that produce the lateral accelerations 240. The lateral accelerations 240 are yaw-free maneuvers of the vehicle 100 that move the vehicle 100 laterally. The lateral accelerations 240 generally cover multiple different lateral maneuvers from a slight movement of the vehicle 100 to more aggressive maneuvers that change lanes for the vehicle 100 by one or two lanes. The different lateral accelerations 240 provide for maneuvering in different emergency events, such as where a greater extent of the roadway may be blocked. The lateral accelerations 240 define controls for inducing the lateral maneuvers in the vehicle 100 without producing yaw acceleration. Thus, the lateral accelerations generally involve temporarily disabling the ABS and the ESC to prevent interference from these systems while suturing one or more of the rear tires of the vehicle 100 for different periods of time to induce sliding.

Figure 3:
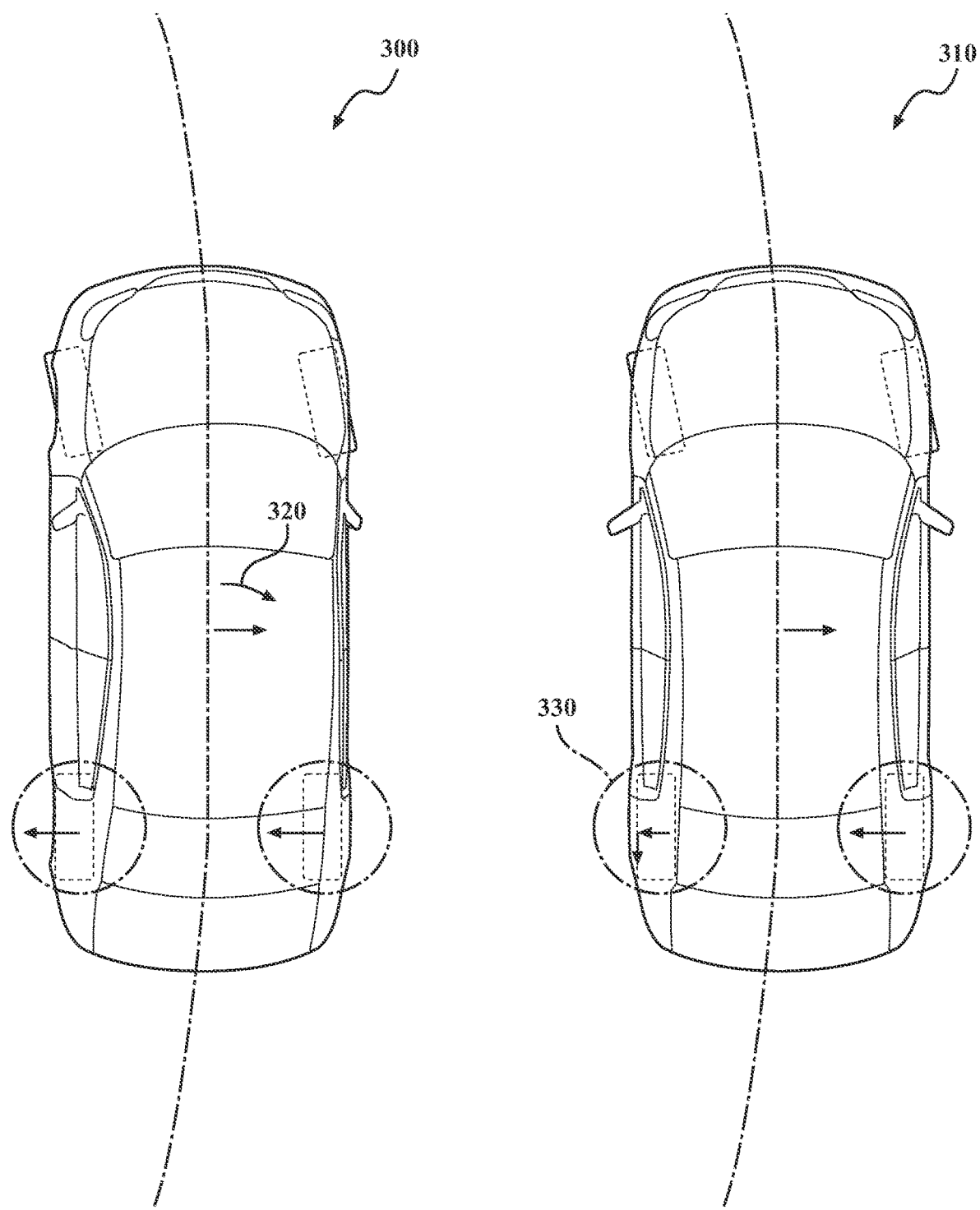
FIG. 3 is a diagram illustrating one example of how a vehicle is controlled to perform a lateral acceleration using brake saturation versus using steering alone.

By way of example, consider FIG. 3, which illustrates wheels of the vehicle 100 during a first maneuver 300 and during a second maneuver 310. In the first maneuver 300, the vehicle is steering along a path to induce a lateral position change (i.e., movement laterally relative to the lane of travel) that includes yaw 320 (i.e., significant yaw acceleration or change in yaw rate) since the rear wheels remain in traction with a surface of the roadway and resist the rear of the vehicle 100 moving. By contrast, the second maneuver 310 represents a lateral acceleration in which a rear inside tire 330 is saturated such that the tire 330 slides from the brake of the associated wheel locking due to an application of brake pressure without the interference of the ABS. The second maneuver 310 induces a lateral position change that is similar to the above maneuver but without a change in yaw rate (i.e., substantially zero) since the rear tire 330 is sliding and not inducing significant body roll/yaw. Accordingly, the lateral accelerations 240 define different lateral maneuvers for controlling the vehicle 100.

The braking module 220 further determines the presence of an emergency event from which a determination can be made about whether to apply one of the lateral accelerations 240. As previously noted, the emergency event generally represents a hazard to the vehicle 100, such as an obstacle in the path of the vehicle 100, a pothole or another abnormality in the road surface, and so on. The braking module 220 detects the presence of an emergency event by using a machine learning algorithm or another machine perception technique to process the sensor data 250 and identify the presence of the hazard.

Thus, when the braking module 220 detects the presence of such a hazard, the braking module 220 may further determine whether a path/trajectory of the vehicle 100 corresponds with a location of the hazard. A correspondence between the path and the location defines an emergency event that is a potential collision hazard for the vehicle 100. In response to detecting the emergency event, the braking module 220 selects one of the lateral accelerations 240 that maneuvers the vehicle 100 away from the hazard. While the vehicle 100 could potentially perform a complete lane or multiple lane changes by selecting a particular one of the lateral accelerations 240, in general, the braking module 220 optimizes the maneuver by selecting a lateral maneuver that is sufficient to avoid the hazard, but that is not excessive. This can avoid difficulties with ensuring the area of the maneuver is clear and can further minimize an extent of intervening control with manual operation of the vehicle 100.

In any case, once the braking module 220 selects the lateral maneuver from the lateral accelerations 240, the braking module 220 executes the maneuver. In one configuration, the braking module 220 executes the maneuver by directly controlling the vehicle 100. In a further arrangement, the braking module 220 causes another system of the vehicle 100, such as the autonomous driving module 160, to control the vehicle 100 by providing the maneuver to the system. In any case, the control system 170 can induce lateral movements in the vehicle 100 that are yaw-free by controlling one or more rear brakes to apply pressure that locks the wheel from rotating, thereby saturating the tire and inducing sliding in the rear end of the vehicle 100. This maneuver provides for an efficient way to move the vehicle laterally while maintaining stability in high-speed corners and other similar circumstances.

Figure 4:
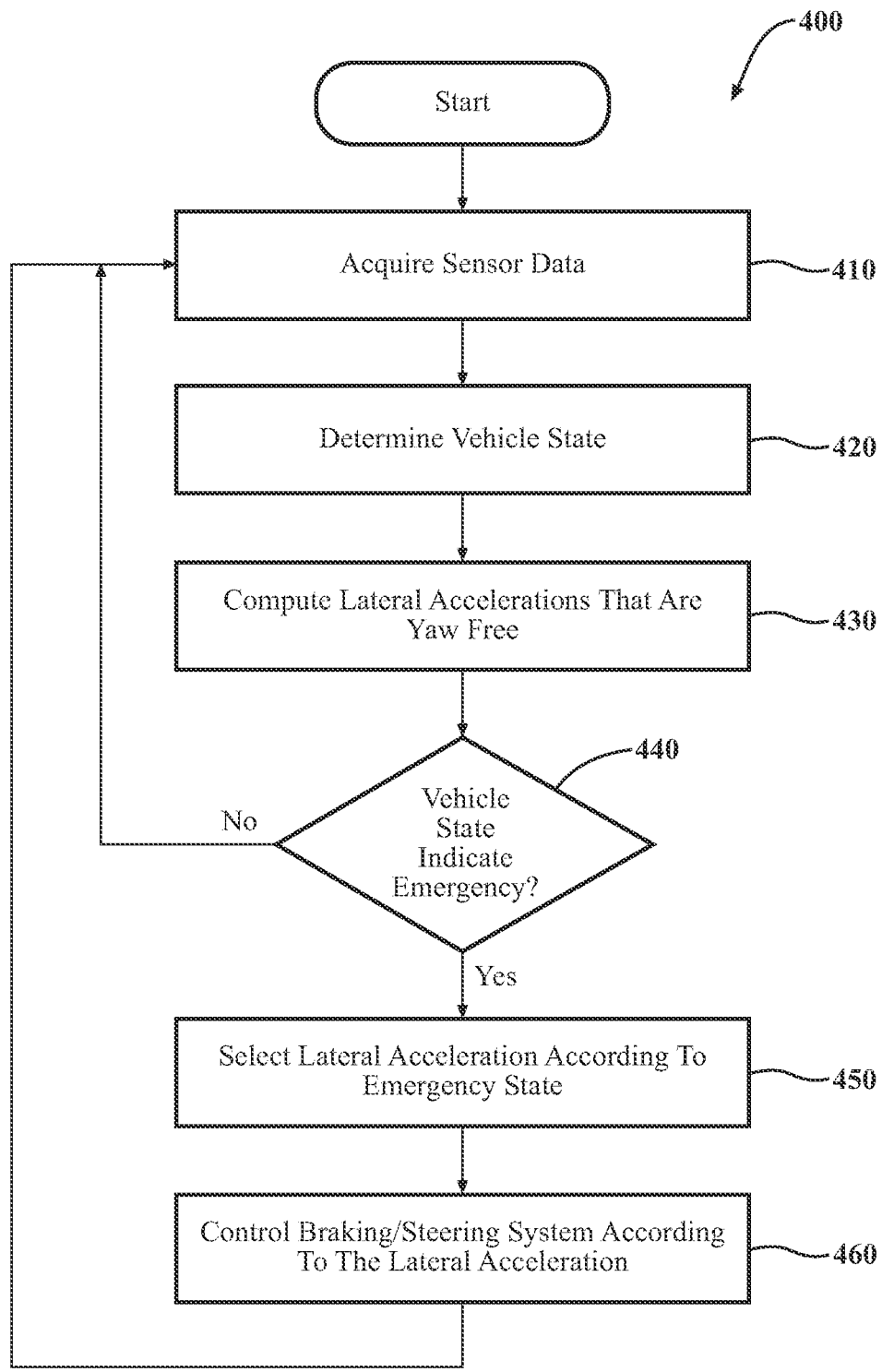
FIG. 4 illustrates one embodiment of a method that is associated with emergency lateral maneuvers of a vehicle.

Additional aspects of using yaw-free lateral maneuvers to avoid hazards will be discussed in relation to FIG. 4. FIG. 4 illustrates a flowchart of a method 400 that is associated with controlling the vehicle 100 to perform lateral accelerations. Method 400 will be discussed from the perspective of the control system 170. While method 400 is discussed in combination with the control system 170, it should be appreciated that the method 400 is not limited to being implemented within the control system 170 but is instead one example of a system that may implement the method 400.

At 410, the braking module 220 controls the sensor system 120 to acquire the sensor data 250. In one embodiment, the braking module 220 controls various sensors, such as a LiDAR and a camera 126 of the vehicle 100 to observe the surrounding environment. Alternatively, or additionally, the braking module 220 controls sensors, such as a radar or another set of sensors to acquire the sensor data 250. Furthermore, in addition to external observations, the vehicle 100 acquires internal observations about the vehicle 100 from sensors within the vehicle 100 that measure aspects relating to dynamics of the vehicle 100.

As part of controlling the sensors to acquire the sensor data 250, it is generally understood that the sensors acquire external observations in the sensor data 250 of a region around the vehicle 100 from different types of sensors. Thus, the braking module 220, in one embodiment, controls the sensors to acquire the sensor data 250 of the surrounding environment. Moreover, in further embodiments, the braking module 220 controls the sensors to acquire the sensor data 250 at successive iterations or time steps. Thus, the control system 170, in one embodiment, iteratively executes the functions discussed at blocks 410-440 to acquire the sensor data 250 and provide information therefrom. Furthermore, the braking module 220, in one embodiment, executes one or more of the noted functions in parallel for separate observations in order to maintain updated perceptions. Additionally, as previously noted, the braking module 220, when acquiring data from multiple sensors, fuses the data together to form the sensor data 250 and to provide for improved determinations of detection, location, and so on.

At 420, the braking module 220 determines a vehicle state for the vehicle 100 according to sensor data 250. The vehicle state provides a derivation of the sensor 250 to further explicitly identify the dynamics of the vehicle 100 in relation to aspects, such as yaw (including yaw rate and acceleration), trajectory (i.e., direction and speed), and so on. In a further aspect, the vehicle state also identifies whether a hazard/obstacle is present on the roadway proximate to the vehicle 100. Accordingly, in addition to deriving the dynamics from the sensor data 250, the braking module 220 may process images and other information to segment and classify hazards from the data so that further determinations about whether the hazards are a direct threat to the vehicle 100 may be undertaken. In one configuration, the braking module 220 implements various machine learning algorithms to perform segmentation, classification, and so on in order to assess different features in the environment and determine whether the features represent hazards. Moreover, while blocks 410-420 are shown as discrete serial processes, in at least one approach, functions associated with blocks 410-420 execute iteratively to maintain a real-time assessment of the vehicle state.

At 430, the braking module 220 computes, using the sensor data and the vehicle state, the lateral accelerations 240 that are yaw-free for the vehicle 100. In one arrangement, the braking module 220 computes the lateral accelerations 240 to include a range of possible accelerations for maneuvering the vehicle 100 without yaw (with substantially no yaw acceleration), and that cause longitudinal slip in one or more rear wheels of the vehicle by activating an associated rear brake. For example, because the particular nature of a given emergency event may be unknown up until just before an encounter, the braking module 220 computes multiple possible lateral accelerations to account for different circumstances that may garner different amounts of lateral movement. For example, in the instance of a small obstacle that is toward the outside of the lane in which the vehicle 100 is traveling, a slight lateral maneuver may be warranted. By contrast, if the hazard is a multiple vehicle accident, then multiple lane changes may be necessary to avoid the hazard. Accordingly, the braking module 220 computes multiple possible maneuvers to account for the different circumstances.

At 440, the braking module 220 determines whether the vehicle state is associated with an emergency event. In general, the braking module 220 analyzes the vehicle state in relation to an estimated path of the vehicle 100 out to a prediction horizon. Thus, when the hazard correlates with the estimated path, the braking module 220 determines that an emergency event has been detected and is imminent. In this instance, the braking module proceeds to select an appropriate lateral maneuver from the lateral accelerations 240 computed previously.

At 450, the braking module 220 selects a maneuver from the lateral accelerations 240 to implement. For example, as noted previously, the amount of lateral movement for a particular emergency event may vary according to the characteristics of an associated hazard. Thus, depending on an extent to which the braking module 220 determines that the vehicle 100 should move laterally, the braking module 220 selects one of the lateral accelerations 240 that is within an acceptable range of the determined movement. Moreover, it should be appreciated that the braking module 220 selects the maneuver according to current dynamics of the vehicle 100 that generally include aspects of how the vehicle 100 is currently operating, such as whether the vehicle 100 is driving in a left or right high-speed turn, such as may be encountered on a highway or other roadway with relatively higher speeds (e.g., in access of 35 mph).

At 460, the braking module 220 controls the vehicle 100 according to the selected maneuver from block 450. In one configuration, controlling the vehicle 100 to perform the selected maneuver includes multiple different inputs, such as disabling one or more systems of the vehicle 100 that may interfere with the maneuver (e.g., ABS, ESC, etc.), controlling steering of the vehicle 100, and adjusting brake pressure to one or more brakes of the rear wheels of the vehicle 100 to saturate the brake and cause the lateral sliding. The braking module 220 controls the vehicle 100, in this way, to causes the vehicle 100 to move laterally without inducing yaw acceleration in the vehicle 100 as would occur with the use of a lateral steering maneuver alone.

Figure 5:
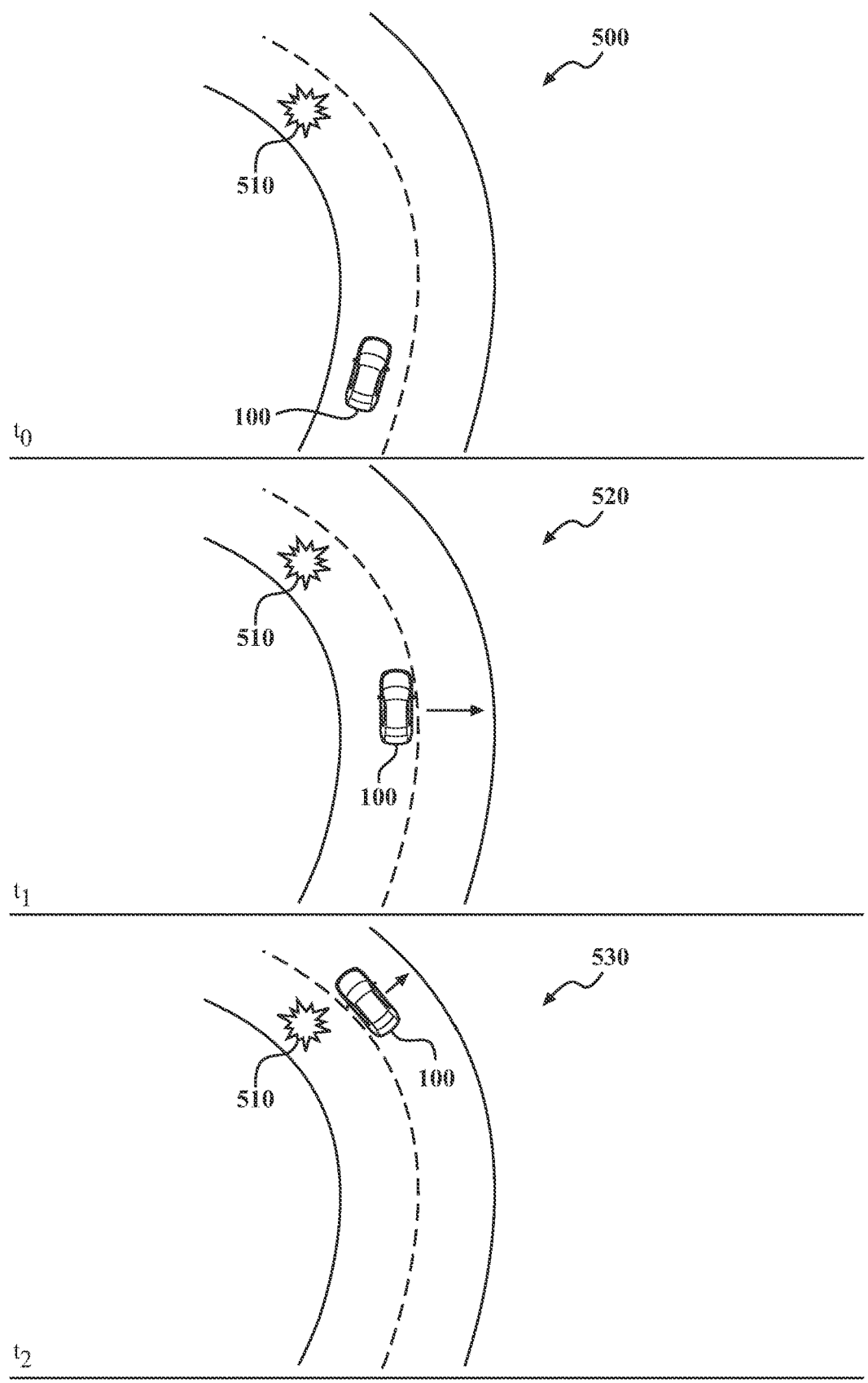
FIG. 5 illustrates a diagram of one example of executing a lateral acceleration to avoid a hazard.

As a further explanation of how the control system 170 functions to use lateral sliding of the vehicle 100 to avoid emergency events, consider FIG. 5, which illustrates an example of the vehicle 100 at different time steps $t_0$-$t_2$. Initially, as shown at 500, the vehicle 100 is proceeding along a high-speed curve and identifies a hazard 510. As the vehicle 100 determines that the hazard is within a path of the vehicle 100, the control system 170 selects a lateral acceleration for the vehicle 100 to avoid the hazard 510 and executes controls that cause the vehicle 100 to perform the lateral acceleration by saturating one or more rear tires of the vehicle 100, as shown at 520. At time step 530, the vehicle 100 continues the maneuver to avoid the hazard.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected" or "communicably connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component, and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100.

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124 (e.g., 4 beam LiDAR), one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes a device, or component, that enables information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed. The braking system 142 may further embody an anti-lock braking system (ABS) that generally functions to prevent tires of the vehicle 100 from sliding during a braking maneuver. That is, the ABS functions to detect wheel slip and adjusts braking to prevent the wheel slip, thereby generally improving braking distances in various conditions. Moreover, the braking system 142 and/or the autonomous driving module 160 may include an electronic stability control (ESC) system that functions to selectively brake individual wheels of the vehicle 100 to maintain overall vehicle stability.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the control system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the control system 170, and/or the autonomous driving module (s) 160 may control some or all of these vehicle systems 140 and, thus, may be partially or fully autonomous.

The processor(s) 110, the control system 170, and/or the autonomous driving module(s) 160 can be operatively connected to communicate with the various vehicle systems 140 and/or individual components thereof. For example, returning to FIG. 1, the processor(s) 110, the control system 170, and/or the autonomous driving module(s) 160 can be in communication to send and/or receive information from the various vehicle systems 140 to control the movement, speed, maneuvering, heading, direction, etc. of the vehicle 100. The processor(s) 110, the control system 170, and/or the autonomous driving module(s) 160 may control some or all of these vehicle systems 140.

The processor(s) 110, the control system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the control system 170, and/or the autonomous driving module(s) 160 can control the direction and/or speed of the vehicle 100. The processor(s) 110, the control system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor (s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor (s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine a position and velocity of the vehicle 100. The autonomous driving module(s) 160 can determine the location of obstacles, obstacles, or other environmental features, including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the control system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module (s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the Figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A control system, comprising:
one or more processors; and
a memory communicably coupled to the one or more processors and storing:
  a braking module including instructions that, when executed by the one or more processors, cause the one or more processors to:
  determine a vehicle state for a vehicle according to sensor data about a surrounding environment;
  compute, using the sensor data and the vehicle state, lateral accelerations that are yaw-free for the vehicle that is without a change in yaw acceleration;
  in response to detecting that the vehicle state is associated with an emergency event of an obstacle in a path of the vehicle, select a maneuver from the lateral accelerations; and control the vehicle according to the maneuver to induce controlled lateral sliding of the vehicle to avoid the obstacle.

2. The control system of claim 1, wherein the lateral accelerations are maneuvers for the vehicle that saturate a rear brake of the vehicle to induce sliding in an associated rear wheel of the vehicle for intentionally inducing the controlled lateral sliding.

3. The control system of claim 1, wherein the braking module includes instructions to compute the lateral accelerations including instructions to compute a range of possible accelerations for maneuvering the vehicle without yaw acceleration and that cause slip in one or more rear wheels of the vehicle by activating an associated rear brake.

4. The control system of claim 1, wherein the braking module includes instructions to control the vehicle according to the maneuver causing the vehicle to move laterally without inducing yaw acceleration in the vehicle by causing the vehicle to perform a controlled slide that facilitates avoiding the obstacle in a high-speed turn.

5. The control system of claim 1, wherein the maneuver is part of a high-speed turn, and wherein braking module includes instructions to control the vehicle according to the maneuver includes instructions to disable an anti-lock braking system.

6. The control system of claim 1, wherein the braking module includes instructions to acquire the sensor data from the vehicle about the vehicle and the surrounding environment of the vehicle, and
wherein the sensor data includes observations about the surrounding environment and dynamics of the vehicle.

7. The control system of claim 1, wherein the braking module includes instructions to detect that the vehicle state is associated with the emergency event including instructions to identify a hazard within a path of the vehicle, including the obstacle.

8. The control system of claim 1, wherein the braking module includes instructions to select the maneuver from the lateral accelerations including instructions to determine which of the lateral accelerations avoid the emergency event by moving the vehicle laterally away from the emergency event.

9. A non-transitory computer-readable medium comprising instructions that, when executed by one or more processors, cause the one or more processors to:
determine a vehicle state for a vehicle according to sensor data about a surrounding environment;
compute, using the sensor data and the vehicle state, lateral accelerations that are yaw-free for the vehicle that is without a change in yaw acceleration;
in response to detecting that the vehicle state is associated with an emergency event of an obstacle in a path of the vehicle, select a maneuver from the lateral accelerations; and
control the vehicle according to the maneuver to induce controlled lateral sliding of the vehicle to avoid the obstacle.

10. The non-transitory computer-readable medium of claim 9, wherein the lateral accelerations are maneuvers for the vehicle that saturate a rear brake of the vehicle to induce sliding in an associated rear wheel of the vehicle for intentionally inducing the controlled lateral sliding.

11. The non-transitory computer-readable medium of claim 9, wherein the instructions to compute the lateral accelerations include instructions to compute a range of possible accelerations for maneuvering the vehicle without yaw acceleration and that cause longitudinal slip in one or more rear wheels of the vehicle by activating an associated rear brake.

12. The non-transitory computer-readable medium of claim 9, wherein the instructions to control the vehicle according to the maneuver cause the vehicle to move laterally without inducing yaw acceleration in the vehicle by causing the vehicle to perform a controlled slide.

13. A method, comprising:
determining a vehicle state for a vehicle according to sensor data about a surrounding environment;
computing, using the sensor data and the vehicle state, lateral accelerations that are yaw-free for the vehicle that is without a change in yaw acceleration;
in response to detecting that the vehicle state is associated with an emergency event of an obstacle in a path of the vehicle, selecting a maneuver from the lateral accelerations; and
controlling the vehicle according to the maneuver to induce controlled lateral sliding of the vehicle to avoid the obstacle.

14. The method of claim 13, wherein the lateral accelerations are controls for the vehicle that saturate a rear brake of the vehicle to induce sliding in an associated rear wheel of the vehicle to induce controlled lateral sliding of the vehicle to avoid the obstacle.

15. The method of claim 13, wherein computing the lateral accelerations includes computing a range of possible accelerations for maneuvering the vehicle without yaw acceleration and that cause slip in one or more rear wheels of the vehicle by activating an associated rear brake.

16. The method of claim 13, wherein controlling the vehicle according to the maneuver causes the vehicle to move laterally without inducing yaw acceleration in the vehicle by causing the vehicle to perform a controlled slide.

17. The method of claim 13, wherein the maneuver is part of a high-speed turn, and
wherein controlling the vehicle according to the maneuver includes instructions to disable an anti-lock braking system.

18. The method of claim 13, further comprising:
acquiring the sensor data from the vehicle about the vehicle and the surrounding environment of the vehicle, wherein the sensor data includes observations about the surrounding environment and dynamics of the vehicle.

19. The method of claim 13, wherein detecting that the vehicle state is associated with the emergency event includes identifying a hazard within a path of the vehicle.

20. The method of claim 13, wherein selecting the maneuver from the lateral accelerations includes determining which of the lateral accelerations avoid the emergency event by moving the vehicle laterally away from the emergency event.

* * * * *